United States Patent
Oh et al.

(10) Patent No.: US 9,703,013 B2
(45) Date of Patent: Jul. 11, 2017

(54) POLARIZING PLATE AND OPTICAL DISPLAY INCLUDING THE SAME

(71) Applicant: SAMSUNG SDI CO., LTD., Yongin-si, Gyeonggi-do (KR)

(72) Inventors: Kyoung Ah Oh, Uiwang-si (KR); Yong Woon Kim, Uiwang-si (KR); Mun Bo Ko, Uiwang-si (KR); Jin Joo Kim, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 0 days.

(21) Appl. No.: 14/805,393

(22) Filed: Jul. 21, 2015

(65) Prior Publication Data

US 2016/0025913 A1 Jan. 28, 2016

(30) Foreign Application Priority Data

Jul. 23, 2014 (KR) .................. 10-2014-0093081

(51) Int. Cl.
*G02B 5/30* (2006.01)
*G02B 1/14* (2015.01)

(52) U.S. Cl.
CPC ............. *G02B 1/14* (2015.01); *G02B 5/3025* (2013.01); *G02B 5/3083* (2013.01)

(58) Field of Classification Search
CPC .. G02B 1/11; G02B 1/111; G02B 1/14; G02B 5/3025; G02B 5/3041; G02B 5/3083; G02B 27/286; G02F 1/133528; G02F 1/133634

USPC ......... 359/487.02, 489.07, 601, 614; 349/96, 349/102, 117, 118, 120; 313/112
See application file for complete search history.

(56) References Cited

U.S. PATENT DOCUMENTS

| | | | |
|---|---|---|---|
| 2005/0200792 A1* | 9/2005 | Jeon ................... | G02F 1/134363 349/141 |
| 2006/0215079 A1* | 9/2006 | Suzuki .............. | G02F 1/133502 349/96 |
| 2008/0024703 A1* | 1/2008 | Ichihashi ............... | C09K 19/56 349/119 |

(Continued)

FOREIGN PATENT DOCUMENTS

| CN | 103207426 A | 7/2013 |
|---|---|---|
| KR | 10-2013-0103595 A | 9/2013 |

(Continued)

OTHER PUBLICATIONS

Taiwan Office action dated Aug. 2, 2016, corresponding to Taiwanese Patent Application No. 104123800 (5 pages).

*Primary Examiner* — Frank Font
(74) *Attorney, Agent, or Firm* — Lewis Roca Rothgerber Christie LLP

(57) ABSTRACT

A polarizing plate includes a polarizer; a first retardation film formed on a lower surface of the polarizer and having an in-plane retardation (Ro) at a wavelength of about 550 nm of about 180 nm to about 220 nm; and a second retardation film formed on a lower surface of the first retardation film and having an in-plane retardation (Ro) at a wavelength of about 550 nm of about 50 nm to about 80 nm. The first and second retardation films have thickness direction retardations (Rth) of opposite signs at a wavelength of about 550 nm. An optical display includes the polarizing plate.

10 Claims, 2 Drawing Sheets

(56) References Cited

U.S. PATENT DOCUMENTS

| | | | | |
|---|---|---|---|---|
| 2008/0218672 A1* | 9/2008 | Ichihashi | G02F 1/134363 | 349/118 |
| 2010/0231830 A1* | 9/2010 | Hirakata | G02B 1/105 | 349/85 |
| 2011/0001908 A1* | 1/2011 | Fukagawa | G02F 1/1393 | 349/102 |
| 2011/0051061 A1* | 3/2011 | Sakai | G02B 5/3083 | 349/117 |
| 2012/0194767 A1* | 8/2012 | Kaihoko | G02F 1/133634 | 349/96 |
| 2013/0342793 A1* | 12/2013 | Takeda | G02F 1/133634 | 349/96 |
| 2015/0002010 A1* | 1/2015 | Lee | G02B 5/3025 | 313/112 |
| 2015/0109561 A1* | 4/2015 | Fuchida | G02B 1/105 | 349/96 |

FOREIGN PATENT DOCUMENTS

| | | |
|---|---|---|
| TW | 201339661 A | 10/2013 |
| TW | 201407209 A | 2/2014 |

\* cited by examiner

POLARIZING PLATE AND OPTICAL DISPLAY INCLUDING THE SAME

CROSS-REFERENCE TO RELATED APPLICATION

This application claims priority to and the benefit of Korean Patent Application No. 10-2014-0093081, filed on Jul. 23, 2014 in the Korean Intellectual Property Office, the entire content of which is incorporated herein by reference.

BACKGROUND

1. Field

Embodiments of the present invention relate to a polarizing plate and an optical display including the same.

2. Description of the Related Art

Optical displays can be classified into self-luminous organic light emitting diode displays and light receiving type displays requiring a separate light source such as a backlight unit and the like, and optical compensation films including retardation films and the like are used to improve the image quality of the displays. The organic light emitting diode displays can exhibit low visibility and contrast due to reflection of external light. To solve this problem, organic light emitting diode displays can realize anti-reflection capabilities by changing linearly polarized light passing through a polarizer into circularly polarized light using a polarizing plate including the polarizer and a retardation film to prevent the reflected external light from leaking outside. Liquid crystal displays can exhibit improved image quality by changing linearly polarized light into circularly polarized light through reflection of external light and sunglass effects.

As an optical compensation film used for polarizing plates of organic light emitting diode displays, mainly two-sheet type films manufactured by stretching or single-sheet type negative dispersive films are used. These films can realize anti-reflection capabilities. However, due to high dependency on the wavelength of incident light, the films can exhibit anti-reflection capabilities in a certain wavelength range and can suffer from deterioration in anti-reflection capabilities in other wavelength ranges. In addition, the films can suffer from deterioration in black visibility causing the screen of the display to appear black even when the screen is viewed in a front direction, and can suffer from deterioration in uniformity of viewing angles in all directions.

SUMMARY

According to embodiments of the present invention, a polarizing plate exhibits good anti-reflection capabilities regardless of the wavelength of incident light.

In accordance with embodiments of the present invention, a polarizing plate includes: a polarizer; a first retardation film formed on a lower surface of the polarizer and having an in-plane retardation (Ro) at a wavelength of about 550 nm of about 180 nm to about 220 nm; and a second retardation film formed on a lower surface of the first retardation film and having an in-plane retardation (Ro) at a wavelength of about 550 nm of about 50 nm to about 80 nm. The first and second retardation films have thickness direction retardations (Rth) of opposite signs at a wavelength of about 550 nm.

The first retardation film may have a thickness direction retardation (Rth) having a positive (+) value at a wavelength of about 550 nm, and the second retardation film may have a thickness direction retardation (Rth) having a negative (−) value at a wavelength of about 550 nm.

The first retardation film may have a thickness direction retardation (Rth) at a wavelength of about 550 nm of about 100 nm to about 120 nm, as calculated by Equation 1.

$$Rth=((nx+ny)/2-nz)\times d \qquad (1)$$

In Equation 1, nx, ny and nz are the indices of refraction at a wavelength of about 550 nm in the x-, y- and z-axis directions of the retardation film, respectively, and d is a thickness of the retardation film (unit: nm)).

The first retardation film may have a degree of bi-axiality (NZ) at a wavelength of about 550 nm of about 1.05 to about 1.07, as calculated by Equation 2.

$$NZ=(nx-nz)/(nx-ny) \qquad (2)$$

In Equation 2, nx, ny and nz are the indices of refraction at a wavelength of about 550 nm in the x-, y- and z-axis directions of the retardation film, respectively.

The second retardation film may have a thickness direction retardation (Rth) at a wavelength of about 550 nm of about −50 nm to about −20 nm, as calculated by Equation 1.

$$Rth=((nx+ny)/2-nz)\times d \qquad (1)$$

In Equation 1, nx, ny and nz are the indices of refraction at a wavelength of about 550 nm in the x-, y- and z-axis directions of the retardation film, respectively, and d is a thickness of the retardation film (unit: nm)).

The second retardation film may have a degree of bi-axiality (NZ) at a wavelength of about 550 nm of about −0.1 to about 0, as calculated by Equation 2.

$$NZ=(nx-nz)/(nx-ny) \qquad (2)$$

In Equation 2, nx, ny and nz are the indices of refraction at a wavelength of about 550 nm in the x-, y- and z-axis directions, respectively, of the retardation film.

The stack body of the first and second retardation films may have a degree of bi-axiality (NZ) at a wavelength of about 550 nm of about 0.4 to about 0.5, as calculated by Equation 4.

$$NZ=(nx-nz)/(nx-ny) \qquad (4)$$

In Equation 4, nx, ny and nz are the indices of refraction at a wavelength of about 550 nm in the x-, y- and z-axis directions, respectively, of the stack body of the retardation films.

The stack body of the first and second retardation films may have a thickness direction retardation (Rth) at a wavelength of about 550 nm of about −5 nm to about 5 nm, as calculated by Equation 3.

$$Rth=((nx+ny)/2-nz)\times d \qquad (3)$$

In Equation 3, nx, ny and nz are the indices of refraction at a wavelength of about 550 nm in the x-, y- and z-axis directions, respectively, of the stack body of the retardation films, and d is a thickness of the stack body of the retardation films (unit: nm)).

At least one of the first and second retardation films may be a multilayer film having two or more layers.

The polarizing plate may further include a protective film on an upper surface of the polarizer.

In accordance with some embodiments of the present invention, an optical display may include the polarizing plate described herein.

DETAILED DESCRIPTION

Figure 1:
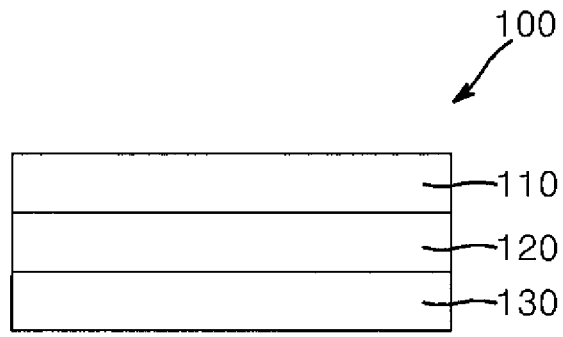
FIG. 1 is a schematic cross-sectional view of a polarizing plate according to embodiments of the present invention.

Embodiments of the present invention will now be described with reference to the accompanying drawings. It is understood that the present invention may be embodied in different ways and is not limited to the following embodiments. In the drawings, portions irrelevant to the description are omitted for clarity. Like components are denoted by like reference numerals throughout the specification. As used herein, terms such as "upper side (surface)" and "lower side (surface)" are defined with reference to the accompanying drawings. Thus, it will be understood that the term "upper side (surface)" can be used interchangeably with the term "lower side (surface)".

FIG. 1 is a schematic cross-sectional view of a polarizing plate according embodiments of the present invention. Referring to FIG. 1, a polarizing plate 100 includes: a polarizer 110; a first retardation film 120 formed on a lower surface of the polarizer 110 and having an in-plane retardation (Ro) at a wavelength of about 550 nm of about 180 nm to about 220 nm; and a second retardation film 130 formed on a lower surface of the first retardation film 120 and having an in-plane retardation (Ro) at a wavelength of about 550 nm of about 50 nm to about 80 nm. The first and second retardation films 120, 130 have thickness direction retardations (Rth) of opposite signs at a wavelength of about 550 nm. For example, in some embodiments, the first retardation film 120 may have an in-plane retardation (Ro) of about 180 nm, 181 nm, 182 nm, 183 nm, 184 nm, 185 nm, 186 nm, 187 nm, 188 nm, 189 nm, 190 nm, 191 nm, 192 nm, 193 nm, 194 nm, 195 nm, 196 nm, 197 nm, 198 nm, 199 nm, 200 nm, 201 nm, 202 nm, 203 nm, 204 nm, 205 nm, 206 nm, 207 nm, 208 nm, 209 nm, 210 nm, 211 nm, 212 nm, 213 nm, 214 nm, 215 nm, 216 nm, 217 nm, 218 nm, 219 nm or 220 nm at a wavelength of about 550 nm. In addition, the first retardation film 120 may have an in-plane retardation (Ro) at a wavelength of about 550 nm ranging from any one of the values set forth above to any other of the values set forth above.

In some embodiments, the second retardation film 130 may have an in-plane retardation (Ro) at a wavelength of about 550 nm of about 50 nm, 51 nm, 52 nm, 53 nm, 54 nm, 55 nm, 56 nm, 57 nm, 58 nm, 59 nm, 60 nm, 61 nm, 62 nm, 63 nm, 64 nm, 65 nm, 66 nm, 67 nm, 68 nm, 69 nm, 70 nm, 71 nm, 72 nm, 73 nm, 74 nm, 75 nm, 76 nm, 77 nm, 78 nm, 79 nm or 80 nm. In addition, the second retardation film 130 may have an in-plane retardation (Ro) at a wavelength of about 550 nm ranging from any one of the values set forth above to any other of the values set forth above.

In order for a polarizing plate to exhibit anti-reflection capabilities when used for organic light emitting diode displays, a retardation film alone or a stack body of retardation films (included in the polarizing plate) should be capable of changing linearly polarized light passing through the polarizer into circularly polarized light. To this end, the retardation film alone or the stack body of retardation films should ideally have a short-wavelength dispersion of about 0.8181, a long-wavelength dispersion of about 1.1818, and a thickness direction retardation (Rth) close to 0.

As used herein, the term "short-wavelength dispersion" refers to Ro (450)/Ro (550) and the term "long-wavelength dispersion" refers to Ro (650)/Ro (550), where Ro (450), Ro (550) and Ro (650) refer to in-plane retardations (Ro) at wavelengths of about 450 nm, about 550 nm and about 650 nm, respectively, of the retardation film alone or the stack body of retardation films.

Since the first and second retardation films 120, 130 have thickness direction retardations (Rth) of opposite signs at a wavelength of about 550 nm, the stack body of the first and second retardation films 120, 130 may have a thickness direction retardation (Rth) at a wavelength of about 550 nm that is almost 0. Thus, the polarizing plate according to embodiments of the present invention can effectively exhibit anti-reflection capabilities when applied to organic light emitting diode displays. If the first and second retardation films have thickness direction retardations (Rth) at a wavelength of about 550 nm having the same sign, color shift may increase for each angle due to a narrowed viewing angle.

In addition, since the stack body of the first and second retardation films 120, 130 may have a short-wavelength dispersion of about 0.78 to about 0.80 and a long-wavelength dispersion of about 1.03 to about 1.04, the polarizing plate can realize anti-reflection capabilities. For example, the polarizing plate according to embodiments of the present invention may have a reflectance of about 5% to about 6% in the visible light range, for example, at a wavelength of about 380 nm to about 800 nm. Within this range, the polarizing plate has anti-reflection capabilities, and therefore can be used in organic light emitting diode displays.

Further, in the polarizing plate according to embodiments of the present invention, since the first retardation film 120 has an in-plane retardation (Ro) at a wavelength of about 550 nm of about 180 nm to about 220 nm and the second retardation film 130 has an in-plane retardation (Ro) at a wavelength of about 550 nm of about 50 nm to about 80 nm, the polarizing plate can reinforce and/or improve black visibility (i.e., reinforce and/or improve the phenomenon by which a screen of the display appears black even in a front direction), reduce color shift, and realize almost constant reflectance regardless of the wavelength of incident light. For example, the polarizing plate according to embodiments of the present invention may have a Δa*b* of about 0 to about 2, as measured by a colorimeter. In some embodiments, the polarizing plate may have a Δa*b* of about 0, 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0, as measured by a colorimeter. In addition, the polarizing plate may have a Δa*b* ranging from any one of the values set forth above to any other of the values set forth above. Within any of these ranges, the polarizing plate may reinforce and/or improve black visibility, and can be applied to organic light emitting diode displays. For example, since the polarizing plate according to embodiments of the present invention may have a low reflectance of about 0.001% to about 0.01% in the visible light range (for example, at a wavelength of about 380 nm to about 800 nm), the polarizing plate can have a uniform viewing angle. As used herein, the term "deviation of reflectance" refers to the difference between the maximum reflectance value and the minimum reflectance value measured in the visible light range.

The polarizing plate according to embodiments of the present invention will now be described with reference to the drawings.

The polarizer 110 converts incident natural light or polarized light into linearly polarized light of a specific direction, and may be manufactured from a polymer film including a polyvinyl alcohol resin as a main component. For example, the polarizer 110 may be manufactured by dyeing the polymer film with iodine or a dichroic dye, followed by stretching in the machine direction (MD). In some embodiments, for example, the polarizer 110 may be manufactured by swelling, dyeing, stretching and crosslinking.

The polarizer 110 may have a thickness of about 2 μm to about 30 μm, for example about 4 μm to about 27 μm. In some embodiments, the polarizer 110 may have a thickness of about 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm or 30 μm. In addition, the polarizer (110) may have a thickness ranging from any one of the values set forth above to any other of the values set forth above. Within any of these ranges, the polarizer 110 can be used in a polarizing plate.

The first retardation film 120 may be stacked on the second retardation film 130, converts linearly polarized light passing through the polarizer 110 into circularly polarized light, and can reinforce and/or improve black visibility. The first retardation film 120 may have an in-plane retardation (Ro) at a wavelength of about 550 nm in a specified range, whereby the polarizing plate can improve anti-reflection capabilities and black visibility, and can realize uniform reflectance regardless of the wavelength of incident light. The first retardation film 120 may have an in-plane retardation (Ro) at a wavelength of about 550 nm of about 180 nm to about 220 nm, for example, about 190 nm to about 200 nm. Within either of these ranges, the polarizing plate can convert linearly polarized light passing through the polarizer 110 into circularly polarized light, and can reinforce and/or improve black visibility.

The first retardation film 120 may have a thickness direction retardation (Rth) at a wavelength of about 550 nm having a different sign (+ or −) than the second retardation film 130. For example, when the first retardation film 120 has a thickness direction retardation (Rth) at a wavelength of about 550 nm having a positive (+) value, the second retardation film 130 may have a thickness direction retardation (Rth) at a wavelength of about 550 nm having a negative (−) value. Conversely, when the first retardation film 120 has a thickness direction retardation (Rth) at a wavelength of about 550 nm having a negative (−) value, the second retardation film 130 may have a thickness direction retardation (Rth) at a wavelength of about 550 nm having a positive (+) value. As a result, the stack body of the first and second retardation films 120, 130 may have a thickness direction retardation (Rth) close to 0, thereby exhibiting anti-reflection capabilities. For example, since the first retardation film 120 may have a greater in-plane retardation (Ro) than the second retardation film 130, the first retardation film 120 may have a thickness direction retardation (Rth) at a wavelength of about 550 nm having a positive (+) value. For example, the first retardation film 120 may have a thickness direction retardation (Rth) at a wavelength of about 550 nm of about 100 nm to about 120 nm, or about 105 nm to about 120 nm, for example, about 105 nm to about 115 nm, as calculated by Equation 1. In some embodiments, the first retardation film 120 may have a thickness direction retardation (Rth) at a wavelength of about 550 nm of about 100 nm, 101 nm, 102 nm, 103 nm, 104 nm, 105 nm, 106 nm, 107 nm, 108 nm, 109 nm, 110 nm, 111 nm, 112 nm, 113 nm, 114 nm, 115 nm, 116 nm, 117 nm, 118 nm, 119 nm, or 120 nm. In addition, the first retardation film 120 may have a thickness direction retardation (Rth) at a wavelength of about 550 nm ranging from any one of the values set forth above to any other of the values set forth above. Within these ranges, the first retardation film can exhibit anti-reflection capabilities in conjunction with the second retardation film.

$$Rth=((nx+ny)/2-nz) \times d \qquad \text{Equation 1}$$

In Equation 1, nx, ny and nz are the indices of refraction at a wavelength of about 550 nm in the x-, y- and z-axis directions, respectively, of the retardation film, and d is a thickness of the retardation film (unit: nm).

The retardation film may have an x-axis direction corresponding to a longitudinal direction thereof (machine direction, MD), a y-axis direction corresponding to a width direction thereof (transverse direction, TD), and a z-axis direction corresponding to a thickness direction thereof.

The first retardation film 120 may have a degree of bi-axiality (NZ) at a wavelength of about 550 nm of about 1.05 to about 1.07, as calculated by Equation 2. Within this range, the polarizing plate can convert linearly polarized light passing through the polarizer into circularly polarized light, can reinforce and/or improving black visibility, and can reduce color shift.

$$NZ=(nx-nz)/(nx-ny) \qquad \text{Equation 2}$$

In Equation 2, nx, ny and nz are the indices of refraction at a wavelength of about 550 nm in the x-, y- and z-axis directions, respectively, of the retardation film.

The first retardation film 120 may have a short-wavelength dispersion of about 0.8 to about 0.9 and a long-wavelength dispersion of about 1.02 to about 1.04. Within these ranges, the first retardation film can allow the polarizing plate to exhibit anti-reflection capabilities when used in a polarizing plate. In the first retardation film 120, nx at a wavelength of about 550 nm may be about 1.57 or greater, for example, about 1.57 to about 1.572, and each of ny and nz at a wavelength of about 550 nm may be less than about 1.57, for example, about 1.569 to about 1.568.

The first retardation film 120 may be manufactured by extruding a retardation film resin, followed by stretching in the machine direction (MD) or transverse direction (TD), for example, MD uniaxial stretching. For example, the first retardation film 120 may be manufactured by stretching at a stretching ratio of 1.45 times to about 1.7 times at about 140° C. to about 160° C., but is not limited thereto. For example, since the first retardation film 120 may have a greater in-plane retardation (Ro) than the second retardation film 130, the first retardation film 120 may be manufactured from a retardation film resin having a higher glass transition temperature (Tg) than the second retardation film 130 in consideration of stretching. As a result, the first retardation film 120 may have a thickness direction retardation (Rth) at a wavelength of about 550 nm having a positive (+) value.

For example, the first retardation film may be manufactured from a resin having a glass transition temperature (Tg) of about 140° C. to about 160° C., and may be manufactured from at least one of a cycloolefin polymer resin and/or a polycarbonate resin, but the first retardation film is not limited thereto. In some embodiments, the first retardation film 120 may be manufactured by extruding at least one of a cycloolefin polymer resin and/or a polycarbonate resin, followed by MD uniaxial stretching.

The first retardation film 120 may have a thickness of about 80 μm to about 110 μm, for example, about 90 μm to about 100 μm. In some embodiments, the first retardation film 120 may have a thickness of about 80 μm, 81 μm, 82 μm, 83 μm, 84 μm, 85 μm, 86 μm, 87 μm, 88 μm, 89 μm, 90 μm, 91 μm, 92 μm, 93 μm, 94 μm, 95 μm, 96 μm, 97 μm, 98 μm, 99 μm, 100 μm, 101 μm, 102 μm, 103 μm, 104 μm, 105 μm, 106 μm, 107 μm, 108 μm, 109 μm or 110 μm. In addition, the first retardation film 120 may have a thickness ranging from any one of the values set forth above to any other of the values set forth above. Within any of these ranges, the first retardation film can be used in a polarizing plate. Further, the first retardation film 120 may be subjected to corona treatment and/or the like so as to be suitably attached to the polarizer and the second retardation film.

The second retardation film 130 may be stacked on the first retardation film 120, converts linearly polarized light passing through the polarizer 110 into circularly polarized light, and can reinforce and/or improve black visibility. In addition, the second retardation film 130 may have a Ro at a wavelength of about 550 nm in a specified range, whereby the polarizing plate can reinforce and/or improve anti-reflection capabilities and black visibility, and can exhibit uniform reflectance regardless of the wavelength of incident light. For example, the second retardation film 130 may have an in-plane retardation (Ro) at a wavelength of about 550 nm of about 50 nm to about 80 nm, for example, about 50 nm to about 70 nm, or about 50 nm to about 60 nm. Within these ranges, the polarizing plate can convert linearly polarized light passing through the polarizer into circularly polarized light, and can reinforce and/or improve black visibility.

As described above, when the first retardation film 120 has a thickness direction retardation (Rth) at a wavelength of about 550 nm having a positive (+) value, the second retardation film 130 may have a thickness direction retardation (Rth) at a wavelength of about 550 nm having a negative (−) value. Conversely, when the first retardation film 120 has a thickness direction retardation (Rth) at a wavelength of about 550 nm having a negative (−) value, the second retardation film 130 may have a thickness direction retardation (Rth) at a wavelength of about 550 nm having a positive (+) value. As a result, the stack body of the first and second retardation films 120, 130 may have has a thickness direction retardation (Rth) at a wavelength of about 550 nm close to 0, thereby exhibiting anti-reflection capabilities.

In some embodiments, since the second retardation film 130 may have a smaller in-plane retardation (Ro) than the first retardation film 120, the second retardation film 130 may have a thickness direction retardation (Rth) at a wavelength of about 550 nm having a negative (−) value. For example, the second retardation film 130 may have a thickness direction retardation (Rth) at a wavelength of about 550 nm of about −50 nm to about −20 nm, for example, about −35 nm to about −20 nm, or about −35 nm to about −25 nm, as calculated by Equation 1. In some embodiments, the second retardation film 130 may have a thickness direction retardation (Rth) at a wavelength of about 550 nm of about −50 nm, −49 nm, −48 nm, −47 nm, −46 nm, −45 nm, −44 nm, −43 nm, −42 nm, −41 nm, −40 nm, −39 nm, −38 nm, −37 nm, −36 nm, −35 nm, −34 nm, −33 nm, −32 nm, −31 nm, −30 nm, −29 nm, −28 nm, −27 nm, −26 nm, −25 nm, −24 nm, −23 nm, −22 nm, −21 nm or −20 nm. In addition, the second retardation film 130 may have a thickness direction retardation (Rth) at a wavelength of about 550 nm ranging from any one of the values set forth above to any other of the values set forth above. Within any of these ranges, the second retardation film can exhibit anti-reflection capabilities in conjunction with the first retardation film.

The second retardation film 130 may have a degree of bi-axiality (NZ) at a wavelength of about 550 nm of about −0.1 to about 0, for example, about −0.05 to about 0, as calculated by Equation 2. Within either of these ranges, the polarizing plate converts linearly polarized light passing through the polarizer into circularly polarized light, reinforces and/or improves black visibility, and reduces color shift.

The second retardation film 130 may have a short-wavelength dispersion of about 1.08 to about 1.1 and a long-wavelength dispersion of about 0.97 to about 1.0. Within these ranges, the second retardation film can allow the polarizing plate to exhibit anti-reflection capabilities when used in the polarizing plate. In the second retardation film 130, each of nx and nz at a wavelength of about 550 nm may be about 1.49 or greater, for example, about 1.49 to about 1.4903, and ny at a wavelength of about 550 nm may be less than about 1.49, for example, about 1.4894 to about 1.489.

The second retardation film 130 may be manufactured by extruding a retardation film resin, followed by stretching the extruded resin in the machine direction or transverse direction, for example, TD uniaxial stretching. For example, the second retardation film 130 may be manufactured by stretching at a stretching ratio of about 1.05 times to about 1.125 times at about 110° C. to about 120° C., but is not limited thereto. In some embodiments, since the second retardation film 130 may have a smaller in-plane retardation (Ro) than the first retardation film 120, the second retardation film 130 may be manufactured from a retardation film resin having a lower glass transition temperature (Tg) than the first retardation film in consideration of stretching.

For example, the second retardation film may be manufactured from a resin having a glass transition temperature (Tg) of about 110° C. to about 120° C., and may be manufactured from at least one of an acrylic, polymethylmethacrylate (PMMA), polystyrene (PS), styrene maleic anhydride (SMA), and/or cycloolefin polymer (COP) resin. In some embodiments, the second retardation film 130 may be manufactured by coextruding at least two of polymethyl methacrylate, polystyrene, SMA and/or a cycloolefin polymer resin, followed by TD uniaxial stretching.

The second retardation film 130 may have a thickness of about 70 μm to about 90 μm, for example, about 70 μm to about 80 μm. In some embodiments, the second retardation film 130 may have a thickness of about 70 μm, 71 μm, 72 μm, 73 μm, 74 μm, 75 μm, 76 μm, 77 μm, 78 μm, 79 μm, 80 μm, 81 μm, 82 μm, 83 μm, 84 μm, 85 μm, 86 μm, 87 μm, 88 μm, 89 μm or 90 μm. In addition, the second retardation film 130 may have a thickness ranging from any one of the values set forth above to any other of the values set forth above. Within any of these ranges, the second retardation film can be used in the polarizing plate. Further, the second retardation film 130 may be subjected to corona treatment and/or the like so as to be suitably attached to the polarizer.

The stack body of the first and second retardation films 120, 130 may have an in-plane retardation (Ro) at a wavelength of about 550 nm of about 125 nm to about 150 nm, for example, about 125 nm to about 145 nm. Additionally, the stack body may have a thickness direction retardation (Rth) at a wavelength of about 550 nm of about −20 nm to about +20 nm, for example, about −5 nm to about +5 nm, as calculated by Equation 3. Also, the stack body may have a degree of bi-axiality (NZ) at a wavelength of about 550 nm of about 0.4 to about 0.5, for example, about 0.45 to about 0.5, as calculated by Equation 4.

In some embodiments, the stack body may have an in-plane retardation (Ro) at a wavelength of about 550 nm of about 125 nm, 126 nm, 127 nm, 128 nm, 129 nm, 130 nm, 131 nm, 132 nm, 133 nm, 134 nm, 135 nm, 136 nm, 137 nm, 138 nm, 139 nm, 140 nm, 141 nm, 142 nm, 143 nm, 144 nm, 145 nm, 146 nm, 147 nm, 148 nm, 149 nm or 150 nm. In addition, the stack body may have an in-plane retardation (Ro) at a wavelength of about 550 nm ranging from any one of the values set forth above to any other of the values set forth above.

In another embodiment, the stack body may have a thickness direction retardation (Rth) at a wavelength of about 550 nm of about −20 nm, −19 nm, −18 nm, −17 nm, −16 nm, −15 nm, −14 nm, −13 nm, −12 nm, −11 nm, −10 nm, −9 nm, −8 nm, −7 nm, −6 nm, −5 nm, −4 nm, −3 nm, −2 nm, −1 nm, 0 nm, +1 nm, +2 nm, +3 nm, +4 nm, +5 nm, +6 nm, +7 nm, +8 nm, +9 nm, +10 nm, +11 nm, +12 nm, +13 nm, +14 nm, +15 nm, +16 nm, +17 nm, +18 nm, +19 nm or +20 nm, as calculated by Equation 3. In addition, the stack body may have a thickness direction retardation (Rth) at a wavelength of about 550 nm ranging from any one of the values set forth above to any other of the values set forth above, as calculated by Equation 3.

Within any of these ranges, the polarizing plate can reinforce and/or improve black visibility, and can reduce color shift. In the stack body of the first and second retardation films 120, 130, each of nx and nz at a wavelength of about 550 nm may be about 1.53 to about 1.575, and ny at a wavelength of about 550 nm may be about 1.52 to about 1.57.

$$Rth=((nx+ny)/2-nz)\times d \qquad \text{Equation 3}$$

In Equation 3, nx, ny and nz are the indices of refraction at a wavelength of about 550 nm in the x-, y- and z-axis directions, respectively, of the stack body of the retardation films, and d is a thickness of the stack body of the retardation films (unit: nm).

$$NZ=(nx-nz)/(nx-ny) \qquad \text{Equation 4}$$

In Equation 4, nx, ny and nz are the indices of refraction at a wavelength of about 550 nm in the x-, y- and z-axis directions, respectively, of the stack body of the retardation films.

Figure 2:
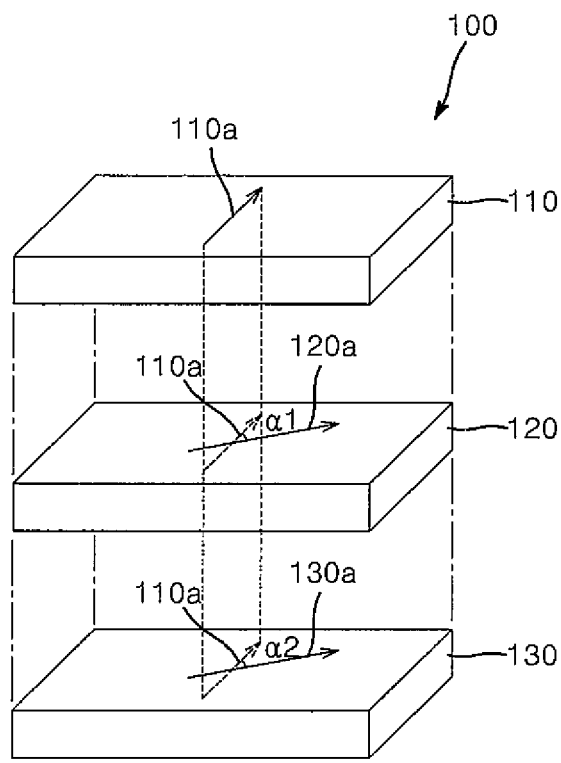
FIG. 2 is a schematic view illustrating an absorption axis of a polarizer, a slow axis of a first retardation film and a slow axis of a second retardation film in a polarizing plate according to embodiments of the present invention.

When Ro, Rth and NZ are measured on the stack body of the first and second retardation films 120, 130, the slow axes of the first and second retardation films may be disposed as shown in FIG. 2.

In the stack body of the first and second retardation films 120, 130, the slow axis (i.e., the film stretching direction) of each of the first and second retardation films 120, 130 may be disposed in the same direction with respect to the absorption axis of the polarizer 110.

FIG. 2 shows the absorption axis 110a of the polarizer 110, the slow axis 120a of the first retardation film 120 and the slow axis 130a of the second retardation film 130 in the polarizing plate 100 according to embodiments of the present invention. When the clockwise direction is defined as + and the counterclockwise direction is defined as—with respect to the absorption axis 110a of the polarizer in FIG. 2, an angle α1 between the absorption axis 110a of the polarizer and the slow axis 120a of the first retardation film 120 with respect to the absorption axis 110a of the polarizer may be about +40° to about +50°, and an angle α2 between the absorption axis 110a of the polarizer and the slow axis 130a of the second retardation film 130 with respect to the absorption axis 110a of the polarizer may be about +40° to about +50°.

In some embodiments, for example, the angle α1 between the absorption axis 110a of the polarizer and the slow axis 120a of the first retardation film 120 may be about +40°, +41°, +42°, +43°, +44°, +45°, +46°, +47°, +48°, +49° or +50°. In addition, the angle α1 between the absorption axis 110a of the polarizer and the slow axis 120a of the first retardation film 120 may range from any one of the values set forth above to any other of the values set forth above.

In some embodiments, the angle α2 between the absorption axis 110a of the polarizer and the slow axis 130a of the second retardation film 130 may be about +40°, +41°, +42°, +43°, +44°, +45°, +46°, +47°, +48°, +49° or +50°. In addition, the angle α2 between the absorption axis 110a of the polarizer and the slow axis 130a of the second retardation film 130 may range from any one of the values set forth above to any other of the values set forth above.

An angle between the slow axis of the first retardation film and the slow axis of the second retardation film may be about 0° to about 10°. In some embodiments, for example, the angle between the slow axis of the first retardation film and the slow axis of the second retardation film may be about 0°, 1°, 2°, 3°, 4°, 5°, 6°, 7°, 8°, 9° or 10°, for example, about 0°. In addition, the angle between the slow axis of the first retardation film and the slow axis of the second retardation film may range from any one of the values set forth above to any other of the values set forth above. Within any of these ranges, the polarizing plate can exhibit good anti-reflection capabilities and black visibility. FIG. 2 shows that the slow axis of each of the first and second retardation films 120, 130 is disposed in the clockwise direction with respect to the absorption axis 110a of the polarizer.

Although the first and second retardation films 120, 130 are illustrated as monolayer films, each of the first retardation film and/or the second retardation film may be a multilayer film having two or more layers, which may be manufactured by melting and coextruding at least two resins. In some embodiments, the second retardation film may be a bilayer or tri-layer film made of cycloolefin and polystyrene resins, for example, a tri-layer film made of cycloolefin, polystyrene and cycloolefin resins.

Although not shown in FIG. 1, the polarizer 110 and the first retardation film 120 may be bonded to each other via a first adhesive layer, and the first and second retardation films 120, 130 may be bonded to each other via a second adhesive layer. The first and second adhesive layers may be formed of the same or different adhesive, which may be any suitable adhesive. For example, the adhesive may include at least one of a photocurable adhesive and/or a pressure-sensitive adhesive (PSAs). Each of the first and second adhesive layers may have a thickness of about 5 μm to about 30 μm. In some embodiments, for example, each of the first and second adhesive layers may have a thickness of about 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm or 30 μm. In addition, each of the first and second adhesive layers may have a thickness ranging from any one of the values set forth above to any other of the values set forth above.

Further, although not shown in FIG. 1, a third adhesive layer may be formed on a lower surface of the second retardation film 130 to allow attachment of the polarizing plate to an organic light emitting device. The third adhesive layer may be formed of at least one of a photocurable adhesive and/or a pressure-sensitive adhesive (PSAs), and may have a thickness of about 5 μm to about 30 μm. In some embodiments, for example, the third adhesive layer may have a thickness of about 5 μm, 6 μm, 7 μm, 8 μm, 9 μm, 10

μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm or 30 μm. In addition, the third adhesive layer may have a thickness ranging from any one of the values set forth above to any other of the values set forth above.

The polarizing plate 100 may have a thickness of about 90 μm to about 300 μm. Within this range, the polarizing plate can be used in optical displays. In some embodiments, for example, the polarizing plate 100 may have a thickness of about 90 μm, 100 μm, 110 μm, 120 μm, 130 μm, 140 μm, 150 μm, 160 μm, 170 μm, 180 μm, 190 μm, 200 μm, 210 μm, 220 μm, 230 μm, 240 μm, 250 μm, 260 μm, 270 μm, 280 μm, 290 μm or 300 μm. In addition, the polarizing plate 100 may have a thickness ranging from any one of the values set forth above to any other of the values set forth above.

Figure 3:
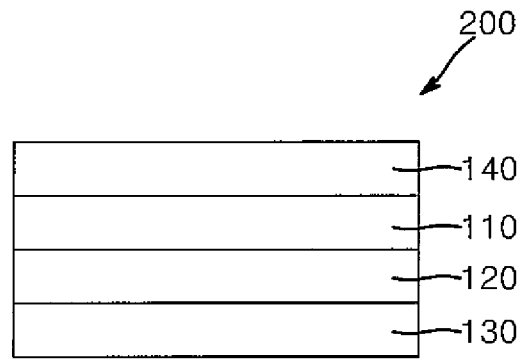
FIG. 3 is a schematic cross-sectional view of a polarizing plate according to embodiments of the present invention.

Hereinafter, a polarizing plate according to embodiments of the present invention will be described with reference to FIG. 3. FIG. 3 is a schematic cross-sectional view of a polarizing plate according embodiments of the present invention.

Referring to FIG. 3, a polarizing plate 200 according to embodiments of the present invention includes: a polarizer 110; a first retardation film 120 formed on a lower surface of the polarizer 110 and having an in-plane retardation (Ro) at a wavelength of about 550 nm from about 180 nm to about 200 nm; a second retardation film 130 formed on a lower surface of the first retardation film 120 and having an in-plane retardation (Ro) at a wavelength of about 550 nm from about 50 nm to about 80 nm; and a protective film 140 formed on an upper surface of the polarizer 110. The first and second retardation films 120, 130 have thickness direction retardations having opposite signs (i.e., + and −) at a wavelength of about 550 nm. The polarizing plate 200 includes the protective film 140 for protecting the polarizing plate from external environments, and for improving the mechanical strength of the polarizing plate. Since the polarizing plate 200 is substantially the same as the polarizing plate 100 depicted in FIG. 1 except for the protective film, only the protective film will now be described.

The protective film 140 protects the polarizer from external environments and may be an optically transparent film made of, for example, at least one of a cellulose including triacetyl cellulose (TAC) and/or the like, a polyester including polyethylene terephthalate, polybutylene terephthalate, polyethylene naphthalate (PET), polybutylene naphthalate and/or the like, a cyclic polyolefin, a polycarbonate, a polyether sulfone, a polysulfone, a polyamide, a polyimide, a polyolefin, a polyacrylate, a polyvinyl alcohol, a polyvinyl chloride, and/or a polyvinylidene chloride resin. For example, the protective film 140 may be a TAC or PET film.

The protective film 140 may have a thickness of about 5 μm to about 70 μm, for example, about 15 μm to about 45 μm. In some embodiments, the protective film 140 may have a thickness of about 5 μm, 10 μm, 15 μm, 20 μm, 25 μm, 30 μm, 35 μm, 40 μm, 45 μm, 50 μm, 55 μm, 60 μm, 65 μm or 70 μm. In addition, the protective film 140 may have a thickness ranging from any one of the values set forth above to any other of the values set forth above. Within any of these ranges, the protective film can be used in the polarizing plate.

Although not shown in FIG. 3, a functional coating layer may be formed on an upper surface of the protective film 140 to impart an additional function to the polarizing plate. For example, the functional coating layer may include a hard coating layer, an anti-fingerprinting layer, an anti-reflective layer, and/or the like. A single one of these layers may be used, or two or more of them may be stacked together.

In some embodiments, the functional coating layer may be a hard coating layer, which may be formed of a transparent material capable of realizing a pencil hardness of B or higher. Although the functional coating layer may be formed of an inorganic coating material, the functional coating layer may also be formed of an organic coating material, such as a thermally curable or photocurable material, thereby improving adhesion to the protective film. For example, the functional coating layer may be formed of at least one of a urethane (meth)acrylate, a (meth)acrylate, an epoxy, a urethane, and/or a silicone resin, but is not limited thereto.

Although not shown in FIG. 3, an adhesive layer may be formed between the protective film and the polarizer, thereby bonding the protective film and the polarizer to each other. The adhesive layer may be formed of any suitable photocurable adhesive, water-based adhesive, pressure-sensitive adhesive, or the like.

According to some embodiments, an optical display may include the polarizing plate according to embodiments of the present invention. For example, the optical display may include an organic light emitting diode (OLED) display or a liquid crystal display.

Figure 4:
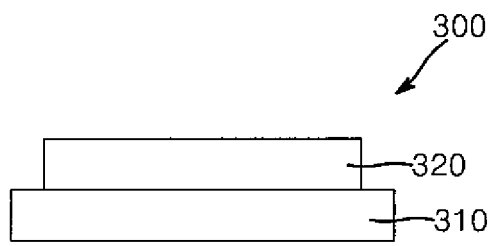
FIG. 4 is a schematic cross-sectional view of an organic light emitting diode display according to embodiments of the present invention.

Hereinafter, an organic light emitting diode display according to embodiments is described with reference to FIG. 4. Referring to FIG. 4, an organic light emitting diode display 300 according to embodiments of the present invention includes: a panel 310 for OLEDs; and a polarizing plate 320 formed on an upper side of the panel 310 for OLEDs. The polarizing plate 320 may include a polarizing plate according to embodiments of the present invention.

Embodiments of the present invention will now be described with reference to some examples. However, it is understood that these examples are provided for illustration only and are not to be construed in any way as limiting the present invention.

Example 1

A polyvinyl alcohol film (PS#60, thickness before stretching: 60 μm, Kuraray Co., Ltd., Japan) was stretched to 6 times its initial length in an aqueous solution of iodine at 55° C., thereby manufacturing a polarizer having a transmittance of 45%. A first retardation film having a retardation value as listed in Table 1 was manufactured by performing MD uniaxial stretching of an un-stretched polycarbonate film (Cheil Industries Inc., Korea) to 1.5 times its initial length at 140° C. A second retardation film having a retardation value as listed in Table 1 was manufactured by performing TD uniaxial stretching of a film obtained by coextruding a cycloolefin polymer (COP, Okura Co., Ltd.) and polystyrene (PS, Okura Co., Ltd.) into a three layered COP-PS-COP film to 1.05 times its initial length at 120° C.

The first and second retardation films were stacked using a pressure sensitive adhesive (PSA) (EG-813, Yoyo INK Co., Ltd.) such that an angle between the slow axes of the first and second retardation films was 0°, and the polarizer was stacked on an upper surface of the first retardation film using a PSA (EG-813, Yoyo INK Co., Ltd.) such that the slow axis of the first retardation film and the slow axis of the second retardation film formed +45° and +45° angles, respectively, with respect to the absorption axis of the polarizer. A hard-coated TAC film (CHP2S, DNP Co., Ltd.) was stacked on the polarizer, thereby manufacturing a polarizing plate.

Table 1 shows the retardations and degree of biaxiality, Ro, Rth and NZ, of each of the first and second retardation films alone, and the Ro, Rth and NZ were measured at a wavelength of 550 nm using a Kobra WPR (Oji Co., Ltd.). Table 2 shows the retardations, degree of biaxiality and refraction indices, Ro, Rth, NZ, nx, ny and nz, of the stack body of the first and second retardation films. Here, the Ro, Rth, NZ, nx, ny and nz were measured at a wavelength of 550 nm using Kobra WPR (Oji Co., Ltd.). The short-wavelength dispersion and long-wavelength dispersion were calculated by measuring Ro at wavelengths of 450 nm, 550 nm and 650 nm using the Kobra WPR (Oji Co., Ltd.).

Examples 2 to 4

In each of Examples 2 to 4, a polarizing plate was manufactured as in Example 1, except that the first and second retardation films were modified as listed in Table 1.

Comparative Example 1

A polarizing plate was manufactured as in Example 1, except that a λ/4 retardation film (QWP, Konica Co., Ltd., Ro: 147 nm, Rth: 111 nm and NZ=1.26 at a wavelength of 550 nm) was used instead of the stack body of the first and second retardation films.

Comparative Example 2

A polarizing plate was manufactured as in Example 1, except that the first and second retardation films were modified as listed in Table 1.

TABLE 1

|  | First retardation film | | | Second retardation film | | |
| --- | --- | --- | --- | --- | --- | --- |
|  | Ro (nm) | Rth (nm) | NZ | Ro (nm) | Rth (nm) | NZ |
| Example 1 | 200 | 111.8 | 1.05 | 60 | −31.6 | −0.03 |
| Example 2 | 195 | 108.8 | 1.05 | 60 | −31.6 | −0.03 |
| Example 3 | 190 | 106.2 | 1.05 | 60 | −31.6 | −0.03 |
| Example 4 | 200 | 111.8 | 1.05 | 57 | −31.3 | −0.05 |
| Comparative Example 1 | 147 | 111 | 1.26 | — | — | — |
| Comparative Example 2 | 270.6 | 166.9 | 1.12 | 33.8 | −22 | −0.15 |

TABLE 2

|  | Ro (nm) | Rth (nm) | NZ | nx | ny | nz | Short-wavelength dispersion | Long-wavelength dispersion |
| --- | --- | --- | --- | --- | --- | --- | --- | --- |
| Example 1 | 141.3 | −3.6 | 0.47 | 1.53039 | 1.5296 | 1.53001 | 0.78 | 1.04 |
| Example 2 | 135.6 | −3.1 | 0.48 | 1.53037 | 1.52962 | 1.53001 | 0.78 | 1.04 |
| Example 3 | 129.2 | −3.2 | 0.48 | 1.53035 | 1.52964 | 1.53001 | 0.78 | 1.04 |
| Example 4 | 141.2 | −3.5 | 0.48 | 1.53039 | 1.5296 | 1.53001 | 0.78 | 1.04 |
| Comp. Example 1 | 147 | 111 | 1.26 | 1.5319 | 1.5294 | 1.5288 | 0.97 | 1.01 |
| Comp. Example 2 | 248.6 | 104.3 | 1.12 | 1.5354 | 1.5272 | 1.5272 | 0.64 | 1.09 |

The polarizing plates of the Examples and Comparative Examples were evaluated for reflectance and color shift, and the results are listed in Table 3.

TABLE 3

|  |  | Color shift | | |
| --- | --- | --- | --- | --- |
|  | Reflectance (%) | a* | b* | Δa*b* |
| Example 1 | 5.13 | 0.39 | 1.18 | 1.31 |
| Example 2 | 5.08 | 0.58 | 1.17 | 1.31 |
| Example 3 | 5.21 | −0.18 | 1.31 | 1.32 |
| Example 4 | 5.08 | 0.77 | 1.04 | 1.29 |
| Comparative Example 1 | 5.14 | 4.12 | −17.35 | 17.83 |
| Comparative Example 2 | 18.58 | −4.81 | 7.5 | 8.9 |

As can be seen in Table 3, the polarizing plates according to embodiments of the present invention exhibited good anti-reflection capabilities due to low reflectance, and had significantly lower Δa*b* than the polarizing plates of the Comparative Examples. Thus, displays using the polarizing plates of the Examples according to embodiments of the present invention had improved and/or reinforced black visibility even in the front direction.

Figure 5:
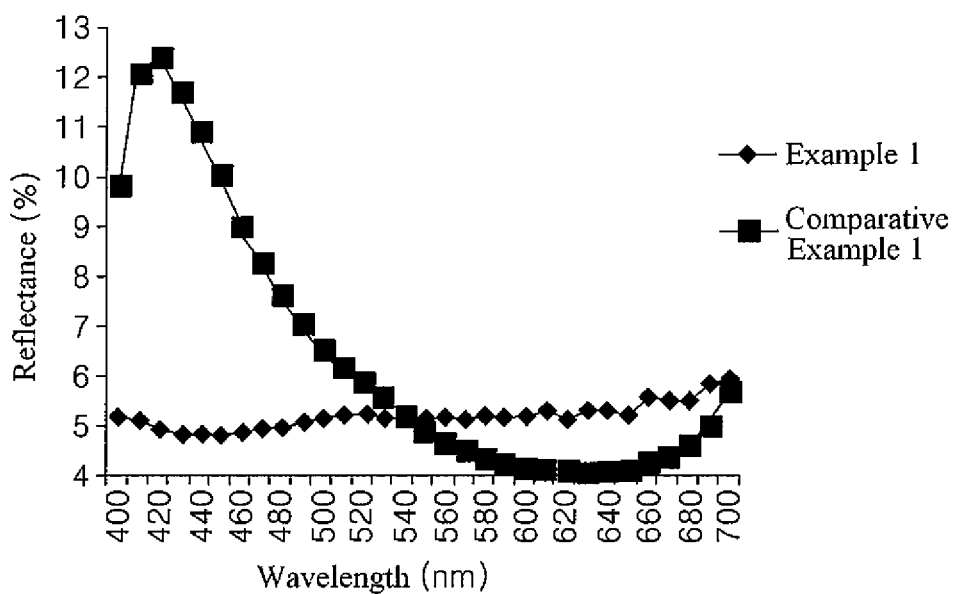
FIG. 5 is a graph comparing the relationship between reflectivity and wavelength of Example 1 and Comparative Example 1.

In addition, as shown in FIG. 5, the polarizing plates according to embodiments of the present invention exhibited uniform reflectance regardless of the wavelength of incident light.

On the other hand, the polarizing plate of Comparative Example 1 exhibited deteriorated black visibility in the front direction due to high Δa*b* despite similarities to the polarizing plates according to embodiments of the present invention, and showed a large deviation in reflectance depending on the wavelength of incident light, as shown in FIG. 5.

In addition, the polarizing plate of Comparative Example 2 (including the retardation film having a retardation outside the ranges according to embodiments of the present invention) did not exhibit black visibility due to a high Δa*b*, and the polarizing plate of Comparative Example 2 could not perform an anti-reflection function due to high reflectance.

Property Evaluation (1) Reflectance: Reflectance was measured using a CM 3600d (Konica Minolta Co., Ltd., Japan). Reflectance in the front direction was measured on each of reference black and white plates, provided to CM 3600d (Konica Minolta Co., Ltd., Japan). On the assumption that reflectance of the black plate is 0 and reflectance of the white plate is 100, the polarizing plate was bonded to a panel via a pressure-sensitive adhesive, followed by measuring the reflectance in the front direction of the polarizing plate, and reflectance was calculated according to the equation: (reflectance of the polarizing plate/reflectance of the white plate)×100.

(2) Color shift (Δa*b*): Color shift (Δa*b*) was measured using a CM 3600d (Konica Minolta Co., Ltd., Japan). The polarizing plate was bonded to a panel via a pressure-sensitive adhesive, followed by measuring each of a* and b* from the front direction to calculate color shift (Δa*b*) by $((a^*)^2+(b^*)^2)^{1/2}$.

While certain exemplary embodiments of the present invention have been illustrated and described, it will be understood by those of ordinary skill in the art that various modifications, changes and alterations can be made to the described embodiments without departing from the spirit and scope of the invention, as defined in the following claims.

Indeed, exemplary embodiments have been disclosed herein, and although specific terms may be employed, they are used, and are to be interpreted, in a generic and descriptive sense only and not for purpose of limitation. In some instances, as would be apparent to those of ordinary skill in the art at the time of filing of the present application, certain features, characteristics, and/or elements described in connection with the presented embodiments may be used singly or in combination with other features, characteristics, and/or elements described in connection with other embodiments, unless otherwise specifically indicated. Accordingly, it is understood by those of ordinary skill in the art that various changes in the form and details may be made without departing from the spirit and scope of the present invention, as set forth in the following claims.

What is claimed is:

1. A polarizing plate comprising:
    a polarizer;
    a first retardation film on a lower surface of the polarizer and having an in-plane retardation (Ro) at a wavelength of about 550 nm of about 180 nm to about 220 nm; and
    a second retardation film on a lower surface of the first retardation film and having an in-plane retardation (Ro) at a wavelength of about 550 nm of about 50 nm to about 80 nm,
    wherein the first retardation film has a thickness direction retardation (Rth) at a wavelength of about 550 nm having a positive (+) value, and the second retardation film has a thickness direction retardation (Rth) at a wavelength of about 550 nm having a negative (−) value.

2. The polarizing plate according to claim 1, wherein the first retardation film has a thickness direction retardation (Rth) at a wavelength of about 550 nm of about 100 nm to about 120 nm, as calculated by Equation 1:

$$Rth=((nx+ny)/2-nz) \times d \qquad (1)$$

wherein nx, ny and nz are indices of refraction at a wavelength of about 550 nm in x-, y- and z-axis directions of the first retardation film, respectively, and d is a thickness of the first retardation film in nm.

3. The polarizing plate according to claim 1, wherein the first retardation film has a degree of bi-axiality (NZ) at a wavelength of about 550 nm of about 1.05 to about 1.07, as calculated by Equation 2:

$$NZ=(nx-nz)/(nx-ny) \qquad (2)$$

wherein nx, ny and nz are indices of refraction at a wavelength of about 550 nm in x-, y- and z-axis directions of the first retardation film, respectively.

4. The polarizing plate according to claim 1, wherein the second retardation film has a thickness direction retardation (Rth) at a wavelength of about 550 nm of about −50 nm to about −20 nm, as calculated by Equation 1:

$$Rth=((nx+ny)/2-nz) \times d \qquad (1)$$

wherein nx, ny and nz are indices of refraction at a wavelength of about 550 nm in x-, y- and z-axis directions of the second retardation film, respectively, and d is a thickness of the second retardation film in nm.

5. The polarizing plate according to claim 1, wherein the second retardation film has a degree of bi-axiality (NZ) at a wavelength of about 550 nm of about −0.1 to about 0, as calculated by Equation 2:

$$NZ=(nx-nz)/(nx-ny) \qquad (2)$$

wherein nx, ny and nz are indices of refraction at a wavelength of about 550 nm in x-, y- and z-axis directions of the second retardation film, respectively.

6. The polarizing plate according to claim 1, wherein a stack body of the first and second retardation films has a degree of bi-axiality (NZ) at a wavelength of about 550 nm of about 0.4 to about 0.5, as calculated by Equation 4:

$$NZ=(nx-nz)/(nx-ny) \qquad (4)$$

where nx, ny and nz are indices of refraction at a wavelength of about 550 nm in x-, y- and z-axis directions of the stack body of the retardation films, respectively.

7. The polarizing plate according to claim 1, wherein a stack body of the first and second retardation films has a thickness direction retardation (Rth) at a wavelength of about 550 nm of about −5 nm to about 5 nm, as calculated by Equation 3:

$$Rth=((nx+ny)/2-nz) \times d \qquad (3)$$

wherein nx, ny and nz are indices of refraction at a wavelength of about 550 nm in x-, y- and z-axis directions, respectively, of the stack body of the retardation films, and d is a thickness of the stack body of the retardation films in nm.

8. The polarizing plate according to claim 1, wherein at least one of the first and second retardation films is a multilayer film having two or more layers.

9. The polarizing plate according to claim 1, further comprising:
    a protective film on an upper surface of the polarizer.

10. An optical display comprising the polarizing plate according to claim 1.

* * * * *